United States Patent
Uskudar et al.

(10) Patent No.: US 11,799,733 B2
(45) Date of Patent: Oct. 24, 2023

(54) ENERGY USAGE IN A COMMUNICATIONS NETWORK

(71) Applicant: Telefonaktiebolaget LM Ericsson (publ), Stockholm (SE)

(72) Inventors: Armagan Uskudar, Basking Ridge, NJ (US); Premnath Kandhasamy Narayanan, Athlone (IE); Mahmood Osorio, Rockwall, TX (US); James O'Meara, Athlone (IE); Amy De Buitléir, Kilcar (IE); Eugene Gomes, Plano, TX (US); Diego Martos, Plano, TX (US); Donald Stephen Staudte, Huddinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 78 days.

(21) Appl. No.: 17/435,969

(22) PCT Filed: Oct. 28, 2020

(86) PCT No.: PCT/EP2020/080329
§ 371 (c)(1),
(2) Date: Sep. 2, 2021

(87) PCT Pub. No.: WO2022/089741
PCT Pub. Date: May 5, 2022

(65) Prior Publication Data
US 2022/0311675 A1 Sep. 29, 2022

(51) Int. Cl.
*H04L 29/08* (2006.01)
*H04L 41/147* (2022.01)
(Continued)

(52) U.S. Cl.
CPC ........... *H04L 41/147* (2013.01); *H04L 41/16* (2013.01); *H04L 43/08* (2013.01)

(58) Field of Classification Search
CPC .............................. H04L 41/147; H04L 41/16
(Continued)

(56) References Cited

U.S. PATENT DOCUMENTS

| | | | | |
|---|---|---|---|---|
| 2019/0155234 A1* | 5/2019 | Devi | ..................... | G06F 9/5072 |
| 2019/0370695 A1 | 12/2019 | Chandwani et al. | | |
| 2020/0162354 A1* | 5/2020 | Drees | ..................... | G06N 5/022 |

FOREIGN PATENT DOCUMENTS

| | | |
|---|---|---|
| CN | 109784542 A | 5/2019 |
| CN | 111080002 A | 4/2020 |
| WO | 2020/173542 A1 | 9/2020 |

OTHER PUBLICATIONS

International Search Report and Written Opinion issued in International Application No. PCT/EP2020/080329 dated Jul. 5, 2021 (13 pages).

(Continued)

*Primary Examiner* — Adnan M Mirza
(74) *Attorney, Agent, or Firm* — Rothwell, Figg, Ernst & Manbeck, P.C.

(57) ABSTRACT

A method performed by a node in a communications network for predicting energy usage in the communications network. The method comprises obtaining values of network parameters for a plurality of nodes in the communications network and corresponding energy usage measurements for the plurality of nodes, and obtaining a subset of the network parameters that are correlated with the energy usage measurements. The method then comprises training a first model using a first machine learning process to take as input the values of the subset of network parameters for the nodes in the plurality of nodes, and output a prediction of the corresponding energy usage measurements.

20 Claims, 9 Drawing Sheets

(51) Int. Cl.
    *H04L 41/16*     (2022.01)
    *H04L 43/08*     (2022.01)

(58) Field of Classification Search
    USPC ............................................. 709/224
    See application file for complete search history.

(56) References Cited

OTHER PUBLICATIONS

Marco Scutari, "Learning Bayesian Networks with the bnlearn R Package", Journal of Statistical Software, vol. VV, Issue II, Jul. 10, 2010 (22 pages).

Marco Scutari et al., "Bayesian Network Structure Learning, Parameter Learning and Inference", Package 'bnlearn', Sep. 21, 2020 (113 pages).

Marcel Robeer, "Contrastive Explanation for Machine Learning", Master Thesis Business Informatics, Jul. 2018 (176 Pages).

\* cited by examiner

ENERGY USAGE IN A COMMUNICATIONS NETWORK

CROSS REFERENCE TO RELATED APPLICATION(S)

This application is a 35 U.S.C. § 371 National Stage of International Patent Application No. PCT/EP2020/080329, filed Oct. 28, 2020.

TECHNICAL FIELD

This disclosure relates to methods, nodes and systems in a communications network. More particularly but non-exclusively, the disclosure relates to determining energy usage of nodes in communications networks.

BACKGROUND

Energy consumption of communications networks (e.g. telecommunication networks) is increasing as the amount of data being transmitted over the networks increases.

Given this fact, the ability to measure the consumption of different components on a site is becoming increasingly important from both a resource savings perspective and a Carbon emission reduction point of view.

"Energy metering" is a telemetry feature that enables measurements of energy consumption on a radio unit (e.g. radio base station) level by introducing new performance monitoring counters. Such energy metering is often made possible by particular hardware in the radio units.

Energy usage measurements can be used when allocating resources to enable energy savings in a Communications network, for example, by allocating resources in a manner that allows hardware to be powered down (or put to sleep) between transmissions, thus saving energy.

It is an object of embodiments herein to improve energy usage monitoring in a communications network.

SUMMARY

Energy usage measurements in communications networks are used in many processes, such as resource orchestration, in order to reduce energy consumption. It is desirable to be able to measure energy usage on a radio unit level. Going further, to reduce energy consumption, it would be beneficial to be able to determine the energy of individual processes performed on such radio units. For example, there is currently no manner in which to determine energy usage associated with different standards running on the same radio unit, or the energy usage of different models of radio units (for example, from different vendors). Such measurements might be used to improve energy efficiency of a communications network.

Furthermore, as noted above, "Energy metering" is a telemetry feature whereby the consumption of energy can be measured directly with counters being reported from the hardware. However, not all radio units support the "energy metering" feature. Radio units that do not support the measurement of energy telemetry data include, for example, radios with old or legacy hardware, some other radio unit types e.g.: LAA (license assisted access) on 5 GHz Wifi band, and certain Pico nodes or Radio Dots.

There is therefore currently no reliable way to determine the energy consumption values of old radio units, yet these are responsible for a significant portion of traffic, and thus a significant proportion of the energy consumption of communication networks globally. Generally, energy saving measures are only performed on radio units for which energy telemetry data is available, and thus it is challenging to perform energy saving measures on unmetered radio units.

In one solution to this, energy meters (e.g.: Smart Meters) may be installed next to power supply unit (PSU) components on a site and these may be used to make energy usage measurements. However, installing hardware at many sites requires man-power and is time consuming. It may not be possible to install such smart meters on e.g. Pico nodes or Radio Dots. Furthermore, there are issues associated with switching off PSUs and this may not be possible at all for many radio units in the network.

There is thus a need for improved methods of determining energy usage in communications networks, particularly for use in energy saving procedures.

According to a first aspect herein there is a computer implemented method performed by a node in a communications network for determining energy usage in the communications network. The method comprises: obtaining network data for a plurality of nodes in the communications network and corresponding energy usage measurements for the plurality of nodes; obtaining a subset of parameters in the network data that are correlated with the energy usage measurements; and training a first model using a first machine learning process to take as input the values of the subset of parameters for the nodes in the plurality of nodes, and output a prediction of the corresponding energy usage measurements.

In some embodiments, the method further comprises using the first model to predict energy usage for a target node in the communications network, by providing values of the subset of parameters for the target node, to the first model.

According to a second aspect there is a node in a communications network. The node comprises a memory comprising instruction data representing a set of instructions, and a processor configured to communicate with the memory and to execute the set of instructions. The set of instructions, when executed by the processor, cause the processor to: obtain network data for a plurality of nodes in the communications network and corresponding energy usage measurements for the plurality of nodes; obtain a subset of parameters in the network data that are correlated with the energy usage measurements; and train a first model using a first machine learning process to take as input the values of the subset of parameters for the nodes in the plurality of nodes, and output a prediction of the corresponding energy usage measurement.

According to a third aspect there is a node in a communications network. The node comprises processing circuitry adapted to: obtain network data for a plurality of nodes in the communications network and corresponding energy usage measurements for the plurality of nodes; obtain a subset of parameters in network data that are correlated with the energy usage measurements; and train a first model using a first machine learning process to take as input the values of the subset of parameters for the nodes in the plurality of nodes, and output a prediction of the corresponding energy usage measurements.

According to a fourth aspect there is a method performed by a node in a communications network. The method comprises: obtaining training data comprising example input parameter values and corresponding output parameter values for a first model; training the first model using a first machine learning process using the training data; determining a graph structure for the input and output parameters; and validating outputs of the first model, using the graph structure.

According to a fifth aspect there is a node in a communications network. The node comprises a memory comprising instruction data representing a set of instructions, and a processor configured to communicate with the memory and to execute the set of instructions. The set of instructions, when executed by the processor, cause the processor to: obtain training data comprising example input parameter values and corresponding output parameter values for a first model; train the first model using a first machine learning process using the training data; determine a graph structure for the input and output parameters; and validate outputs of the first model, using the graph structure.

According to a sixth aspect there is a node in a communications network. The node comprises processing circuitry adapted to: obtain training data comprising example input parameter values and corresponding output parameter values for a first model; train the first model using a first machine learning process using the training data; determine a graph structure for the input and output parameters; and validate outputs of the first model, using the graph structure.

According to a seventh aspect there is a computer program comprising instructions which, when executed on at least one processor, cause the at least one processor to carry out a method according to the first or fourth aspects.

According to an eighth aspect there is a carrier containing a computer program according to the seventh aspect, wherein the carrier comprises one of an electronic signal, optical signal, radio signal or computer readable storage medium.

According to a ninth aspect there is a computer program product comprising non transitory computer readable media having stored thereon a computer program according to the seventh aspect.

Thus aspects herein provide methods and nodes capable of determining energy usage in a communications network. The methods herein may be used to measure energy usage of unmetered nodes in a communications network, without the need to install new hardware. The methods may further be used to measure energy usage of processes running on nodes in the communications network. For example, so that energy usage per product model (which may be vendor specific), topology, or standard may be determined. Network data (such as network performance indicators) is easily accessible and can be processed independently. Aspects described herein can generally be performed without software or hardware feature development at baseband or node level. Furthermore, minimal to no collaboration or contribution is required from vendors.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

As described above, energy telemetry data (e.g. energy usage measurements) is generally needed in order to make energy savings in nodes in a communications network. For example, to determine when hardware may be optimally shut down or put into sleep mode to conserve energy. However some nodes, such as legacy nodes, are not equipped to make energy telemetry measurements.

As will be described in detail below, embodiments herein use machine learning models to predict energy usage of such nodes, from network data. Embodiments herein thus enable energy usage of nodes to be determined, even when it cannot be directly measured.

The disclosure herein generally relates to a communications network (or telecommunications network). A communications network may comprise any one, or any combination of: a wired link (e.g. ASDL) or a wireless link such as Global System for Mobile Communications (GSM), Wideband Code Division Multiple Access (WCDMA), Long Term Evolution (LTE), New Radio (NR), WiFi, Bluetooth or future wireless technologies. The skilled person will appreciate that these are merely examples and that the communications network may comprise other types of links. A wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Figure 1:
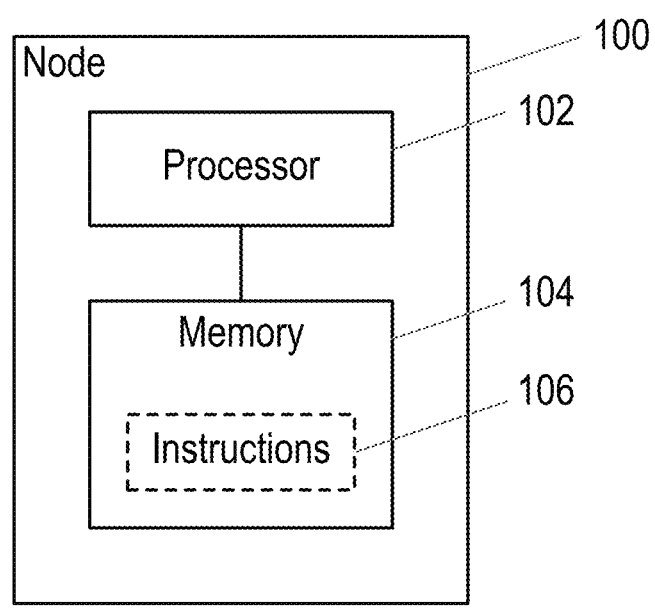
FIG. 1 shows a node according to some embodiments herein.

FIG. 1 illustrates a node 100 in a communications network according to some embodiments herein. Generally, the node 100 may comprise any component or network function (e.g. any hardware or software module) in the communications network suitable for performing the functions described herein. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network.

Examples of nodes include, but are not limited to, access points (APs) (e.g., radio access points), base stations (BSs) otherwise referred to herein as radio units (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC) or Evolved Packet Core (EPC). Further examples of nodes include but are not limited to logical nodes, for example, a particular radio standard operating on a particular radio unit. Thus a radio unit may comprise more than one node if operating more than one standard.

The node 100 is configured (e.g. adapted, operative, or programmed) to perform any of the embodiments of the method 200 as described below. It will be appreciated that the node 100 may comprise one or more virtual machines running different software and/or processes. The node 100 may therefore comprise one or more servers, switches and/or storage devices and/or may comprise cloud computing infrastructure or infrastructure configured to perform in a distributed manner, that runs the software and/or processes.

The node 100 may comprise a processor (e.g. processing circuitry or logic) 102. The processor 102 may control the operation of the node 100 in the manner described herein. The processor 102 can comprise one or more processors, processing units, multi-core processors or modules that are configured or programmed to control the node 100 in the manner described herein. In particular implementations, the processor 102 can comprise a plurality of software and/or hardware modules that are each configured to perform, or are for performing, individual or multiple steps of the functionality of the node 100 as described herein.

The node 100 may comprise a memory 104. In some embodiments, the memory 104 of the node 100 can be configured to store program code or instructions 106 that can be executed by the processor 102 of the node 100 to perform the functionality described herein. Alternatively or in addition, the memory 104 of the node 100 can be configured to store any requests, resources, information, data, signals, or similar that are described herein. The processor 102 of the node 100 may be configured to control the memory 104 of the node 100 to store any requests, resources, information, data, signals, or similar that are described herein.

It will be appreciated that the node 100 may comprise other components in addition or alternatively to those indicated in FIG. 1. For example, in some embodiments, the node 100 may comprise a communications interface. The communications interface may be for use in communicating with other nodes in the communications network (e.g. such as other physical or virtual nodes). For example, the communications interface may be configured to transmit to and/or receive from other nodes or network functions requests, resources, information, data, signals, or similar. The processor 102 of node 100 may be configured to control such a communications interface to transmit to and/or receive from other nodes or network functions requests, resources, information, data, signals, or similar.

Briefly, in one embodiment, the node 100 may be configured to obtain network data for a plurality of nodes in the communications network and corresponding energy usage measurements for the plurality of nodes. The node 100 may be further configured to obtain a subset of parameters in network data that are correlated with the energy usage measurements, and train a first model using a first machine learning process to take as input the values of the subset of parameters for the nodes in the plurality of nodes, and output a prediction of the corresponding energy usage measurements.

Figure 2:
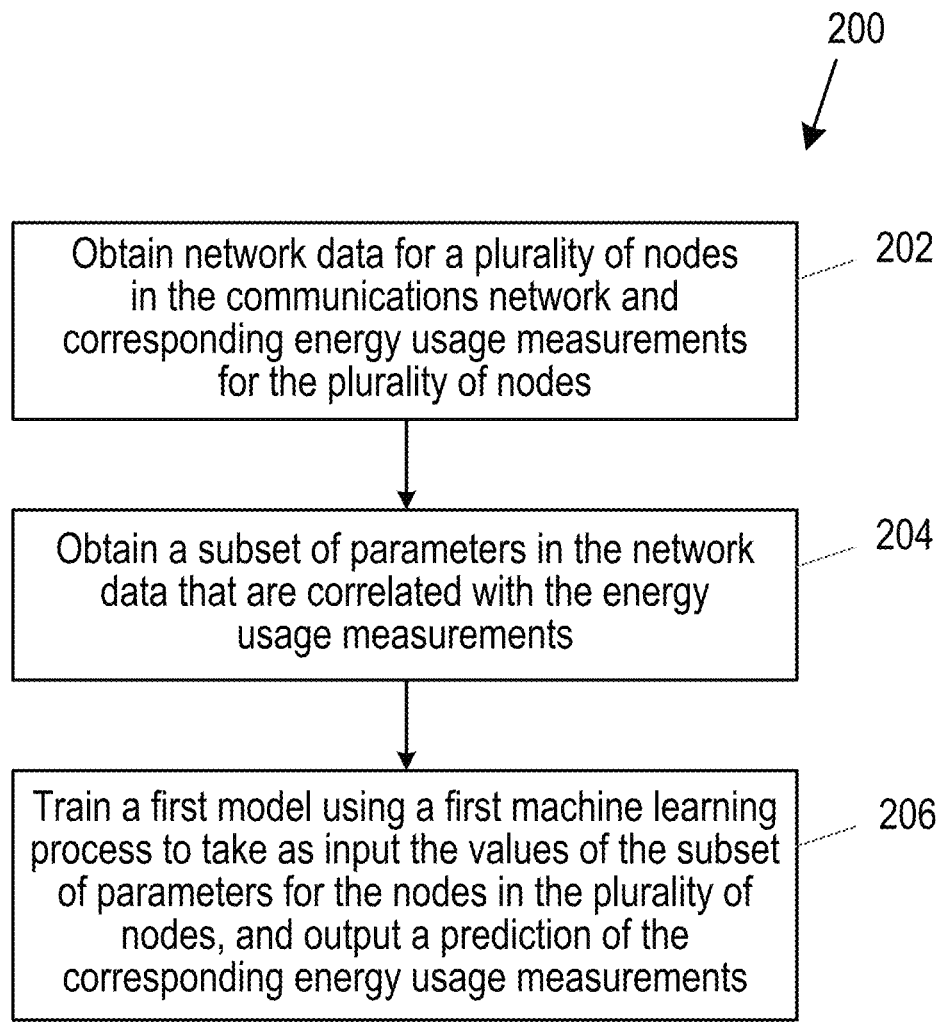
FIG. 2 illustrates a method according to some embodiments herein.

Turning now to FIG. 2, which illustrates a computer implemented method 200 performed by a node in a communications network according to some embodiments herein. The method is for determining (e.g. predicting) energy usage in the communications network. The method 200 may be performed by a node in the communications network such as the node 100 described above.

Briefly, the method 200 comprises in a first step 202, obtaining network data for a plurality of nodes in the communications network and corresponding energy usage measurements for the plurality of nodes. In a second step 204 the method comprises obtaining a subset of parameters (e.g. features or data types) in the network data that are correlated with the energy usage measurements. In a third step 206 the method then comprises training a first model using a first machine learning process to take as input the values of the subset of parameters for the nodes in the plurality of nodes, and output a prediction of the corresponding energy usage measurements.

In more detail, the network data may comprise, for example, network configuration parameters (e.g. such as control management CM parameters), measureable quantities such as values of network performance indicators (e.g. key performance indicators, KPIs) in the communications network, event data and/or alarm data.

Specific examples of KPIs that may be comprised in the network data are listed in the first column of Annex 1. It will be appreciated that the parameters listed therein are examples only, however, and that other types of network data may also be used.

The network data may be obtained from the communications network, for example from logs. Generally the communications network (e.g.: LTE, 5G) provides services to the connected users (e.g.: mobile phones) and devices (e.g.: IoT devices) and logs all the network events, performance counters, fault alarms as they occur. Such data may thus be obtained in step 202.

The network data may be converted into a standard format. For example, such as a tabular format. As an example, configuration data may be provided to the node 100 by the radio network in a graph format, which is then converted to a tabular format. This is described in more detail below.

In step 202, corresponding energy usage measurements for the plurality of nodes are also obtained. The energy usage measurements reflect energy usage of the nodes in the plurality of nodes, at (e.g. approximately) the same time as the network data for the corresponding node is obtained, measured or reported. For example, the energy usage measurements may correspond to the energy usage measurements during an overlapping time window to the network data.

The energy usage measurements may comprise measurements made by an energy metering process, or smart meter, as described above.

Examples of energy measurement parameters that may be obtained include, but are not limited to:

"pmConsumedEnergy (summation of energy consumption of all consumer units having an EnergyMeter)

"pmConsumedEnergyAccumulated" (accumulated energy consumption of all consumer units having an EnergyMeter)

"pmVoltage" (Average power consumption in 6 second periods),

"pmAccumulatedEnergyConsumption" (Accumulated energy consumption from start of MO EnergyMeasurement).

It will be appreciated that these are merely examples and that other network data may also be obtained. As will be discussed in more detail below, other parameters such as a protocol performed by the respective node, or the radio standard (e.g.: Radio access technologies such as 5G, LTE, WCDMA, GSM) may also be obtained. The topology of each node (e.g. whether the node comprises Urban macro cells, Urban small cells, Rural macro cells, Urban indoor cells) may also be obtained. An indication of whether the node is permitted to perform energy savings (e.g. a node may not be permitted to perform energy saving procedures such as entering a sleep-mode if it serves private emergency services) may be obtained. Alternatively or additionally, product model information, (e.g. a product model identifier), and/or vendor information (e.g. a Vendor identifier) may also be obtained.

In step 204, the method comprises obtaining a subset of parameters (e.g. features) in the network data that are correlated with the energy usage measurements. The purpose of this step is to determine appropriate input parameters for the first model, from which the first model may be trained to accurately predict energy usage measurements.

In some embodiments, the node 100 may determine the subset of parameters. In other embodiments, another node (for example, as part of a distributed or cloud computing arrangement) may determine the subset of parameters and send the subset of parameters to the node 100.

Parameters that are correlated with the energy usage measurements may be determined, for example, by plotting parameter values against energy usage measurements in order to determine a correlation. If a resulting graph shows a consistent trend then the parameter is correlated with the energy usage measurements.

More generally, step 204 may be performed using surrogative models, (e.g.: SHAP, LIME, LRP, ELIS, Skate; see Master's Thesis by Robeer, M. J entitled "Contrastive Explanation for Machine Learning"; Utrecht University, 2018.)

In this way, appropriate input parameters may be determined for the first model, from which the first model may be able to accurately predict associated energy usage measurements.

Figure 3:
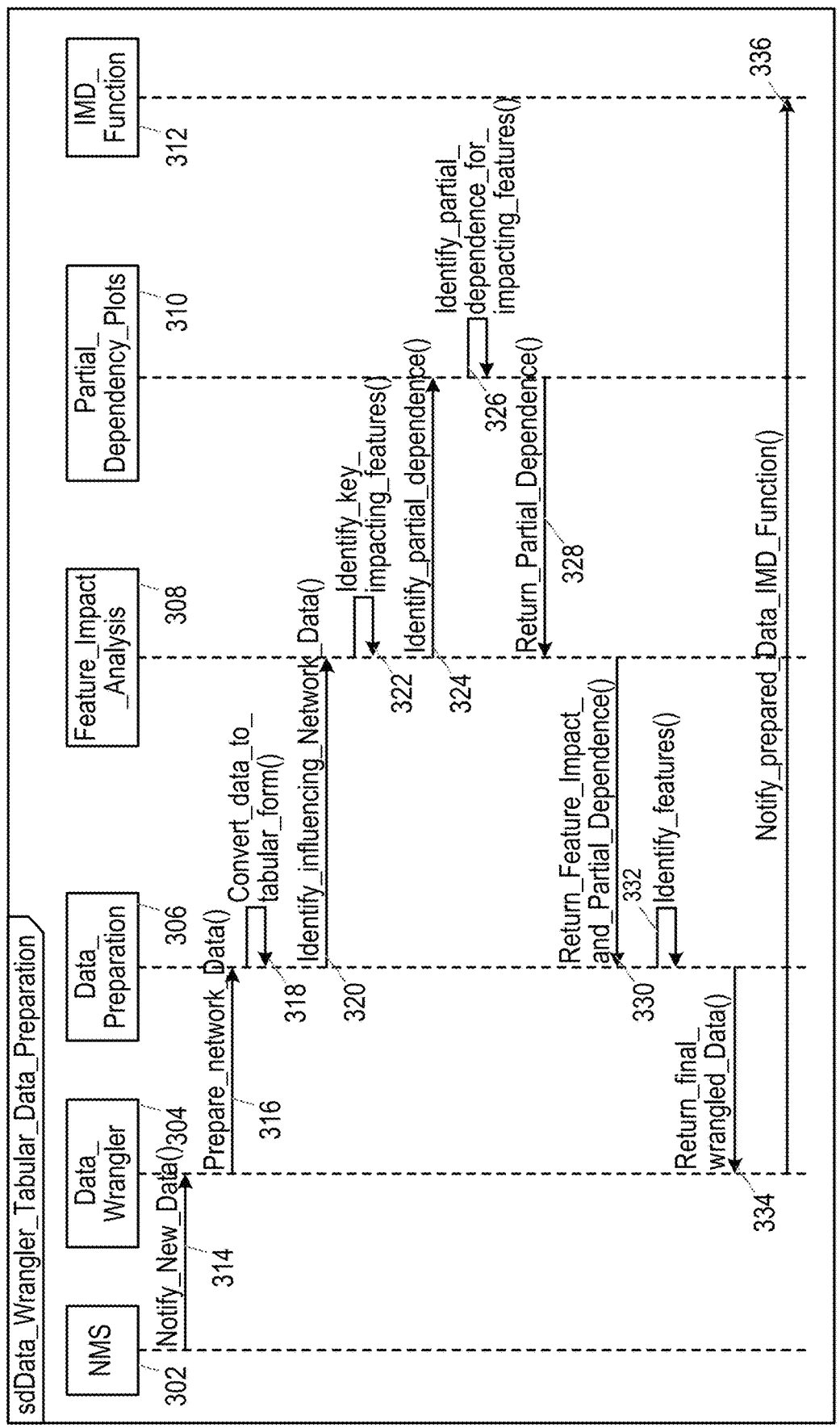
FIG. 3 illustrates a signal diagram according to some embodiments herein.

Turning now to an example, steps 202 and 204 may be performed in the manner illustrated in the signal diagram in FIG. 3. In this embodiment, the method steps 202 and 204 are split over modules (e.g. software modules) comprising a data wrangler 304, a data preparation module 306, a feature impact analysis module 308, a partial dependency plots module 310 and an IMD function 312. With reference to FIG. 1, the aforementioned modules 304-312 may be comprised in a node such as the node 100. The skilled person will appreciate that this is merely an example however and that the method steps may be split in a different manner between these and/or other modules.

The signal diagram comprises the following steps:

In step 314 a Network Management System (NMS) 302 notifies a Data Wrangler module 304 that new network data is available. Data Wrangler 304 obtains 202 the network data for a plurality of nodes in the communications network, and corresponding energy usage measurements from the NMS 302.

In step 316 the Data Wrangler module requests a "Data Preparation" module 306 to convert the network data into a tabular format, suitable for imputing missing telemetry data (e.g. for nodes for which energy measurements are unavailable).

The Data Preparation module 306 then converts the network data into tabular format in step 318. For example, configuration data available in graph format may be converted to the tabular format.

The data preparation module 306 may then slice (e.g. group separately) the network data, e.g. based on radio standard (e.g.: Radio access technologies such as 5G, LTE, WCDMA, GSM), topology (e.g.: Urban macro cells, Urban small cells, Rural macro cells, Urban indoor cells) and whether the nodes are allowed to perform energy savings (e.g.: Cells not meant for private emergency services) running on the network. Note: If there is no telemetry data in a slice (e.g.: GSM Rural) which could happen due to radio type or old technology, then most common influencing KPIs derived in the same technology or topology may be provided by the "Data Preparation" module 306, for further steps.

320: The Data Preparation module 306 sends a request to a Feature Impact Analysis module 308 to cause the feature impact analysis module 308 to perform step 204 described above. In this embodiment, the feature impact analysis module 308 performs step 204 in two stages.

Figure 4A:
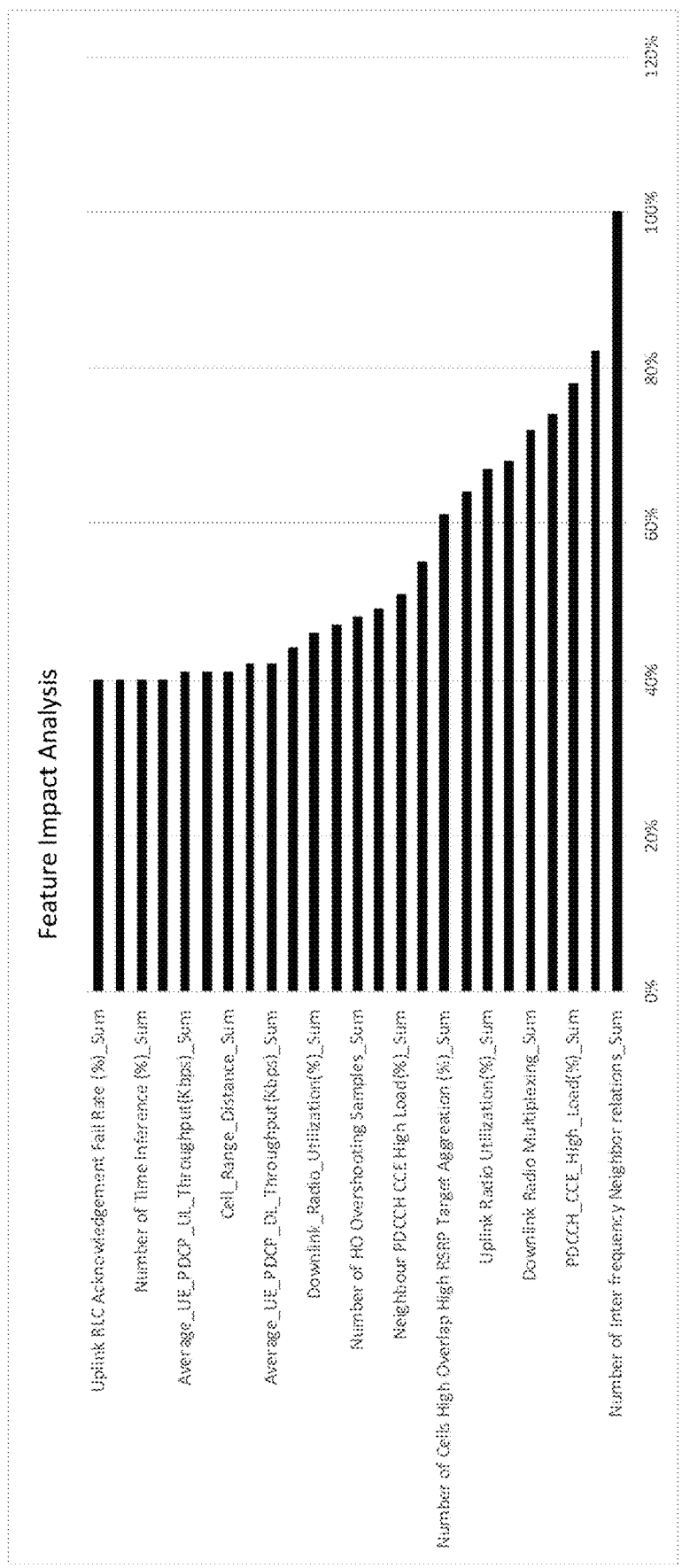
FIGS. 4A, 4B, and 4C show a method of determining correlations between different parameters in a data set.

322: In a first stage, feature impact analysis module 308 uses Surrogative models such as those described in the thesis by Robeer, M. J referenced above to determine candidate parameters in the network data that may be correlated with energy usage. The outcome of this process is illustrated in the plot 400 of FIG. 4a which predicts the impact of different parameters on the energy usage.

324: In a second stage, a Feature Impact Analysis module 308 then requests a Partial Dependency Plot module 310 to identify the partial dependence of the determined candidate parameters.

Figure 4B:
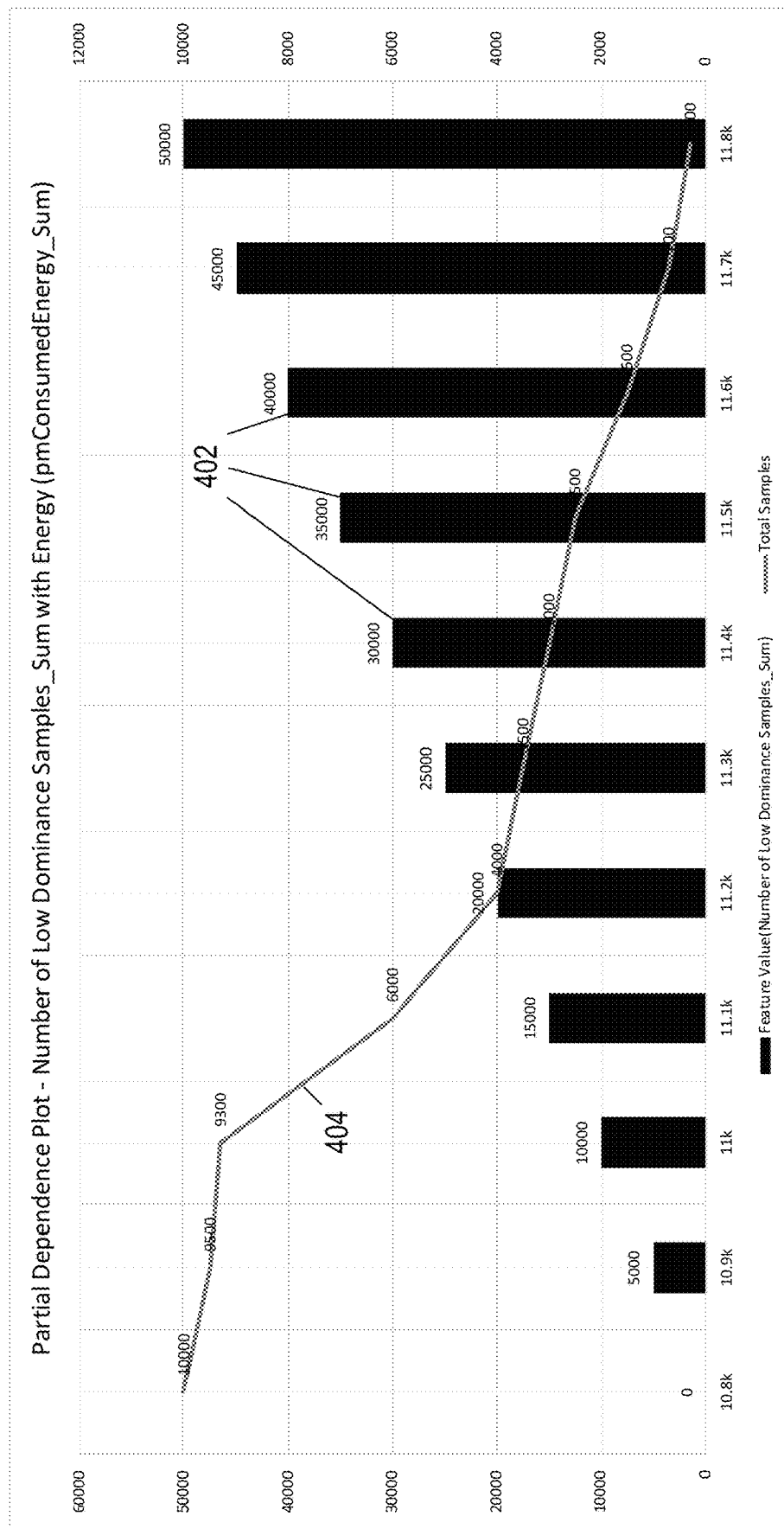
Figure 4C:
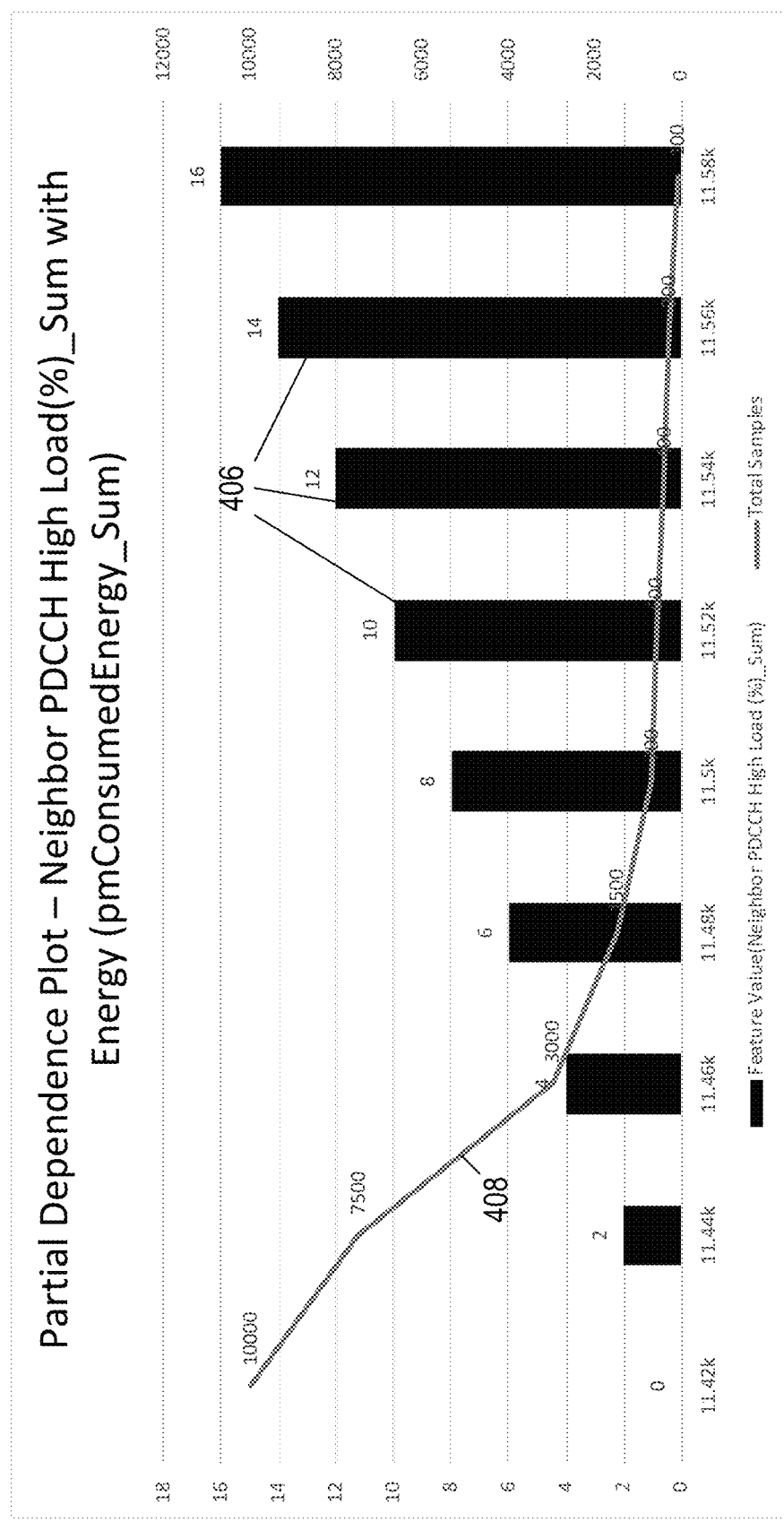

326: The Partial Dependency Plot module 310 Identifies partial dependence plots for the candidate parameters. Examples of partial dependence plots are illustrated in FIGS. 4b and 4c. FIG. 4b which shows how the parameter "number of low dominance samples" correlates with the energy usage measurement "pmConsumedEnergy_Sum". In FIG. 4b, Bars 402 are the KPI's value and line 404 is the number of samples with that value. FIG. 4c shows how the "Neighbor PDCCH High Load (%)_Sum correlates with the energy usage metric "pmConsumed Energy_Sum". Similarly in FIG. 4c, Bars 406 are the KPI's value and line 408 is the number of samples with that value. Only symmetric and linear "Partial Dependence plots" features are selected.

328: The Partial dependence plots module 310 returns partial dependence to Feature Impact Analysis module 308.

330: The Feature Impact Analysis module returns the candidate parameters and partial dependence plots to the Data Preparation module.

332: The "Data Preparation" module then selects, as the subset of parameters, those parameters or features that are correlated with the energy usage measurements as determined from the candidate features having correlations in their respective partial dependency plots.

In some embodiments, the following rules may also be applied in step 204:
  a. only parameters that are on a list of pre-approved parameters (e.g. determined/approved by an expert) may be selected for the subset of parameters. For example, certain features such as site locations, and cell id are generally inappropriate input parameters for AI/ML models as they may encourage the models to memorize certain sites and cells behavior as separate models.
  b. only parameters having symmetric and linear "Partial Dependence plots" are selected for the subset of parameters. E.g. rather than features that have no pattern (memorized by learning algorithms).

334: The Data Preparation Module 304 then returns the final wrangled data (for example, in tabular format) with selected network data.

336: The data wrangler 304 then notifies IMD module for further processing.

The skilled person will appreciate that the steps set out in FIG. 3 are an example only, and the processing described above may be performed by different combinations of modules to those illustrated in FIG. 3. For example, the functionality may be split between different functions or nodes, or all performed by the same function or node. Examples of variations to the steps in FIG. 3 include but are not limited to that the data may be in a tabular format, and thus step 318 may be omitted; in another example, the functionality of the feature impact analysis module 308 may be combined with that of the partial dependency plots module 310. The skilled person will appreciate that these are examples and that other variations to the signals in FIG. 3 are also possible.

Once the subset of parameters has been determined, the method moves to step 206 and training a first model using a first machine learning process to take as input the values of the subset of parameters for the nodes in the plurality of nodes, and output a prediction of the corresponding energy usage measurements.

As an example, training data (e.g. the network data and energy usage measurements) may be of the following format.

[Node, Param1, Param2, Param3, Protocol, Energy Usage, Time]

For example, each training example may correspond to network data for an individual node, performing a particular task/protocol and comprise the energy usage for that node. Each node may be represented by a row of training data. Complete network data may be used (which contains telemetry data too), this may include KPIs, Events and Alarms as well. The skilled person will appreciate that this is merely an example and that other formats may also be used for the training data.

In this step a first model is trained using a first machine learning process, to predict telemetry values such as Energy counters (e.g. for nodes where no such information is otherwise available.) The first model may comprise any model that can be trained to take network data as input and output a prediction of an energy usage measurement. The type of model may depend on the format of the energy usage measurements. For example, the first model may comprise a Regression model for continuous telemetry data or a classification model for categorical telemetry data.

Examples of Regression models (e.g. that may be used to predict telemetry data that is continuous in nature e.g.: Energy counters) include but are not limited to the following:

1. XGBoost with gbtree
2. Randomforest Regressor
3. AVG Blender
4. Decision Tree Regressor
5. Extra Trees Regressor
6. Keras Slim Residual Neural Network Regressor
7. SVM Regressor
8. Ridge Regressor
9. Linear Regressor
10. Mean Response Regressor Examples of Classification models (e.g. that may be used to predict telemetry data in the form of categorical values e.g.: Such as "High", "Low" and "Medium") include but are not limited to:

11. Gradient Boost classifier
12. Rulefit classifier
13. RandomForest classifier
14. XG Boost classifier
15. Keras Slim Residual Neural Network Classifier
16. C4.5 classifier The skilled person will appreciate that these are merely examples, however, and that the first model may comprise a different type of model to those described above.

The skilled person will be familiar with ways in which a model may be trained based on training data. As noted above, herein the training data comprises the values of the subset of parameters of network data (as obtained in steps 202 and 204) and the corresponding ground truth energy usage measurements. The first model may be trained to predict the corresponding energy usage measurements from the values of the subset of parameters, for example, using machine learning processes such as back-propagation, and logistic regression.

In some examples, the step of training a first model may comprise training a plurality of models using a plurality of machine learning processes, and selecting the first model, from the plurality of models, based on a measure of accuracy as determined in a validation procedure.

For example, if the energy usage measurement comprises a continuous variable, then a plurality of models of different types (e.g. from the list 1-10 above, and/or other types of regression model known to the skilled person) may be trained. The models may be validated and the most accurate model may then be selected as the first model in step 206. If the energy usage measurement comprises a discrete variable, then a plurality of models of different types (e.g. from the list 11-16 above, and/or other types of classification model known to the skilled person) may be trained. The models may be validated and the most accurate model may then be selected as the first model in step 206.

The skilled person will be familiar with ways in which a validation procedure may be used to determine the accuracy of a first model as described herein. For example, a subset of the training data may be set aside for validation and determining the accuracy of the first model. Training data may thus be used to train the model and validation data may be used to select the right hyper parameters and best performing model on the validation data set. In this way, the most discriminating model for the particular dataset may be determined in an empirical and automated manner.

As noted above, in some embodiments, the energy usage measurements for the plurality of nodes comprise energy usage measurements associated with different protocols performed by the plurality of nodes. For example, protocols associated with different network standards (3G, 4G, 5G etc). In such embodiments, the step of training 206 the first model comprises training the first model to output a prediction of the corresponding energy usage measurement associated with a respective node performing a respective protocol. In other words, the training data may be sliced according to energy usage per standard and/or protocol. In this way, the prediction of the energy measurement may be more discriminating. E.g. rather than merely providing a prediction of overall energy usage of a radio unit (e.g. such as a RBS), a prediction of energy usage associated with performing tasks according to particular standards, or protocols may be determined. Embodiments herein can thus be used for the estimation of energy consumption per standard when several standards operate on the same radio equipment, and no resolution as to standard is supported by the energy telemetry.

In some embodiments, additionally or alternatively, the energy usage measurements for the plurality of nodes comprise energy usage measurements associated with a (particular) node topology. In other words, where available, the training data used to train the first model may indicate the topology of the respective node. In such embodiments, the step of training 206 the first model comprises training the first model to output a prediction of the corresponding energy usage measurement associated with a respective node topology. In other words, the training data may be sliced according to node topology. In this way, energy usage measurements may be predicted for particular node topologies.

In some embodiments, additionally or alternatively, the energy usage measurements for the plurality of nodes comprise energy usage measurements associated with different product models of the plurality of nodes. In other words, where available, the training data used to train the first model may indicate the product model of the respective node. In such embodiments, the step of training 206 the first model comprises training the first model to output a prediction of the corresponding energy usage measurement associated with a respective product model. In other words, the training data may be sliced according to product model. In this way, energy usage measurements may be predicted for processes associated with different product models operating in the communications network.

The first model may be periodically re-trained in order to maintain accuracy. For example, step 206 may be repeated, e.g. periodically. For example, e.g.: once in a day, or once every n hours. Alternatively or additionally, step 206 may be repeated in response to new network data becoming available, or in response to a detected change in the communications network. New validation data may be selected from any new data that becomes available and this validation data may be used to check for accuracy (e.g. using a confusion matrix). If the accuracy degrades, the first model is retrained as described above. There is thus an automated method of training and updating a first model, e.g. in response to the availability of new network data and/or a change of environment in the communications network.

After training, the (trained) first model may be used to predict energy usage of a target node (e.g. a node of interest for which energy usage measurements may not be available) in the communications network, by providing values of the subset of parameters for the target node, to the first model.

The target node may comprise a node in the communications network for which energy telemetry measurements for the target node are (otherwise) unavailable to the communications network. The target node may, for example, comprise a node without energy metering, for example, a legacy node, or a pico node or radio dot.

In some embodiments, as noted above, the target node may comprise a logical node, such as a particular communications standard running on a particular radio unit. In such embodiments, energy usage may be predicted for processes associated with performing the standard on the radio unit. Thus, the first model may be used to determine (or predict) energy usage measurements at a more granular level compared to energy metering or smart meter capabilities.

The predicted energy usage for the target node may then be used in a subsequent process in the communications network (e.g. in the same manner as a measured value). Examples of subsequent processes include but are not limited to, resource orchestration procedures, e.g. processes to allocate resources to the target node. Or processes involved in energy saving, for example, configuring, activation/deactivation of energy functions on the mobile network (e.g.: cell sleep). This is described in more detail below with respect to FIG. 6 below.

Turning now to other embodiments, in some embodiments, the predicted energy usage (e.g. outputs of the first model) may be validated using graph-based techniques (such as Bayesian techniques), for example, to ensure the prediction is accurate enough for use in a subsequent process. Generally, the method may comprise validating predicted telemetry data for the target node using Bayesian inference.

In more detail, the method 200 may further comprise determining a graph structure from the values of the subset of parameters for the nodes in the plurality of nodes, and the corresponding energy usage measurements, and validating outputs of the first model, using the graph structure.

In some embodiments, the same network data that was used to train the first model may be used to determine a graph-structure with which to validate the outputs of the first model. The skilled person will be familiar with graph-based structures. Graph-structures have nodes representing parameters and edges which link the nodes, indicating a relationship between the linked parameters. In this context, the graph structure comprises nodes and edges, the nodes representing the subset of network parameters in the network data and the energy usage, and the edges representing causal relationships between the nodes.

Figure 5:
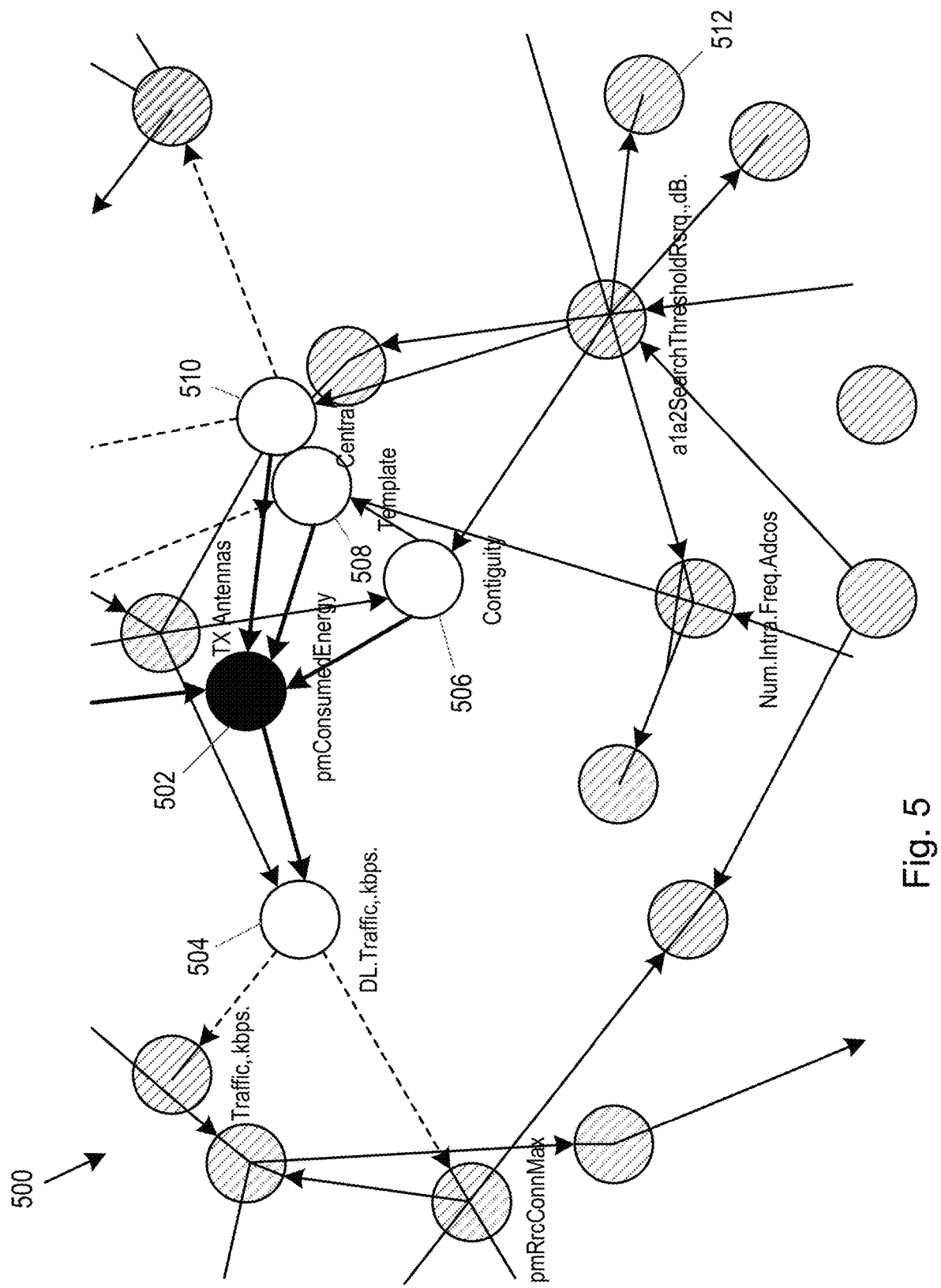
FIG. 5 illustrates a portion of an example Bayesian network.

In some embodiments, the graph structure comprises a Bayesian inference network. This is illustrated in FIG. 5, which shows part of an example Bayesian inference network 500. In this example, the first model predicts the parameter pmConsumedEnergy as shown by the black node 502. In this example, pmConsumedEnergy is influenced by (e.g. correlated with) the parameters illustrated by the white nodes DL.Traffic, kbps 504, Contiguity 506, Template 508, Central Freq. 510 (amongst others). Other (non-influencing) parameters are shown as hatched nodes.

A Bayesian-tree structure may be determined, for example, using a computing library such as bnlearn as described in the paper by Scutari. M (2010) entitled "*Learning Bayesian Networks with the bnlearn R Package.*" Journal of Statistical Software, 35(3), 1-22. This package enables casual analysis of energy counters (e.g.: Energy KPIs, Counter pmConsumedEnergy to show the key influencing entities such as network contiguity KPI, Central Frequency and Template (Topology type—such as Urban, Rural, Sub-Urban)).

By querying the Bayesian-tree a confidence level (or score) for the predicted energy counter can be derived by providing the values of the subset of parameters of the network data as input. In other words, the method 200 may comprise using the graph structure to determine a confidence level for the predicted energy usage. For example, by providing the values of the subset of network parameters for the target node and the predicted energy usage for the target node to the Bayesian network and determining the confidence level in the predicted energy measurement.

For example, a query can be—What is the confidence (or probability) of "pmConsumedEnergy" as 18.5 Kw/h provided contiguity score as 15, Template as Urban and Central Frequency as 2300 MHz?

The answer from the system could be "0.98". When the probability score is >a threshold probability, (e.g. the value of which may be set dependent on accuracy requirements), the imputed value may be considered as a valid value, since the Bayesian network structure is created based on historical network data that contains energy telemetry. Thus generally, if the confidence level is high, then the predicted energy counter can be considered reliable for further processing.

Put another way, the method 200 may further comprise using the predicted energy usage for the target node in a subsequent process if the confidence level is above a threshold confidence level. In this embodiment, energy usage predictions made by the first model may thus be used in subsequent processes (or calculations) in the communications network if they meet a specific norm based on historical data.

In this way, a Bayesian inference network may be used to validate output from the first model, in a manner of a consistency check. The inputs and outputs of the first model are provided to the Bayesian network and the Bayesian network provides a probability score that the input values are correct, given the relationships and correlations known to the Bayesian network through the nodes and edges therein.

A Bayesian network in this manner may ensure that any (unknown) biases in the predictions of the first model do not degrade accuracy.

Although embodiments herein have described the use of Bayesian Inference network, the skilled person will appreciate that the technique applies equally to other graph-based methods.

It is noted that the use of graph-based techniques may be used more widely to validate outputs of any type of (supervised) machine learning model. For example, a method of validating output from a first model may comprise i) obtaining training data comprising example input parameter values and corresponding output parameter values for a first model, ii) training the first model using a first machine learning process using the training data, iii) determining a graph structure for the input and output parameters; and iv) validating outputs of the first model, using the graph structure.

Such a method may be performed by a node in a communications network (such as the node 100 above). Or more generally, by a processor adapted to perform steps i)-iv) above.

As noted above, the graph structure may comprise nodes and edges, the nodes representing the input and output parameters, and the edges representing causal relationships between the nodes. In some embodiments, the graph structure comprises a Bayesian inference network.

Figure 6:
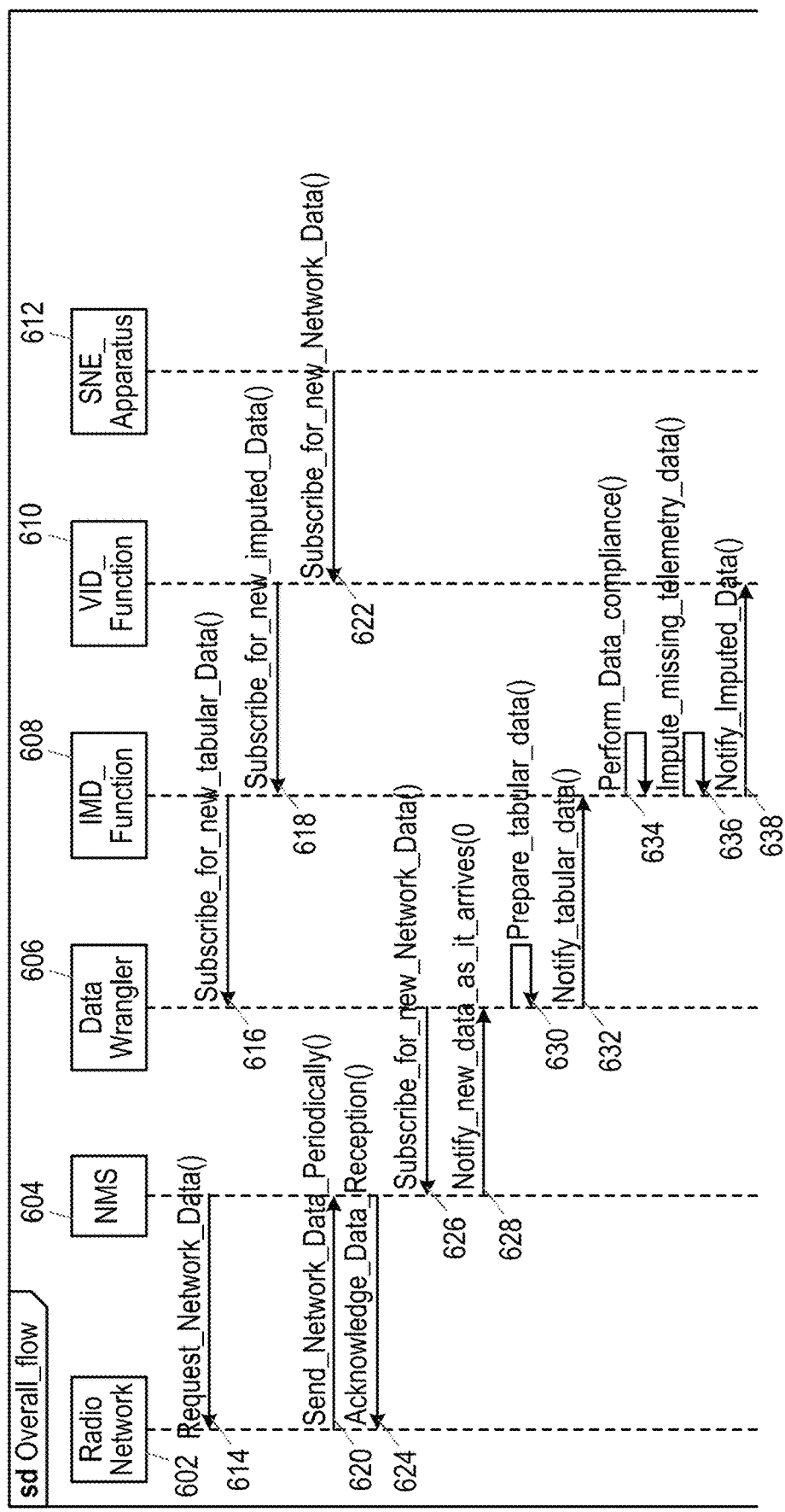
FIG. 6 shows a signal diagram for reducing energy consumption in a communications network according to some embodiments herein.
Figure 6:
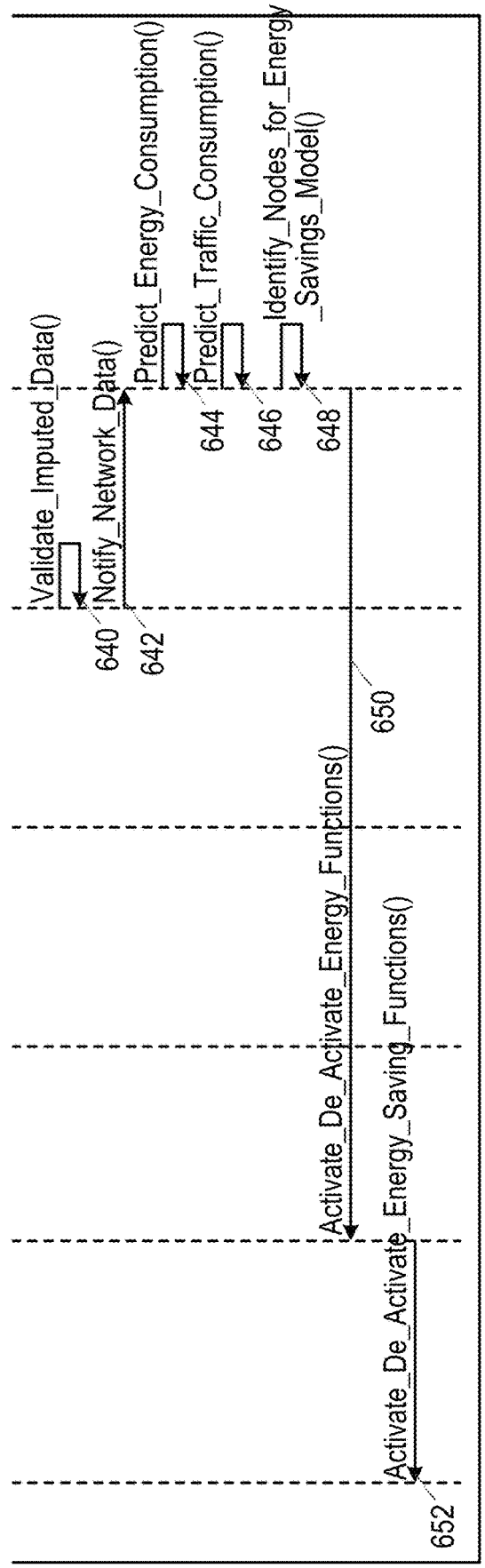

Turning now to FIG. 6, there is a signal diagram according to an embodiment of the method 200 herein that may be used for making energy savings in a communications network. The skilled person will appreciate that the modules and functionality described with respect to FIG. 6 are an example only and that some steps may be performed by different modules to those illustrated therein. With reference to FIG. 1, modules 606-610 may be comprised in a node such as the node 100.

In this embodiment, Radio network 602 provides services to connected users (e.g.: mobile phones) and devices (e.g.: IoT devices). Radio network 602 also logs network data such as network events, performance counters, and information on fault alarms.

"NMS": Network management system 604 requests in message 614 the network data from the radio network 602. The radio Network may send network data periodically 620; 624 to the NMS 604. The NMS processes the network data and provides processed data in a structured format with their respective interfaces. (e.g.: SQL, REST).

The "Data Wrangler" module 606 subscribes 626; 628 to network data updates from the NMS 604. The Data Wrangler module processes 630 the network data into a tabular form (e.g.: coverts graph data to tabular data where applicable). The Data Wrangler further selects the subset of parameters in the network data that are correlated with energy usage (e.g.: KPIs, configurations and events) according to steps 320-334 as was described above with respect to FIG. 3. Further, the Data Wrangler 606 may also identify and mark nodes that do not support energy telemetry (due to hardware version or technology) and creates a list of such nodes with missing values. The data wrangler may then send the tabular data to an IMD ("Imputing missing telemetry data") module 608 in a message 632. (This may be in response to IMD subscribing for new data in a message 616).

The IMD module 608 performs step 206 as described above. The IMD checks the feature impact analysis as shown in FIG. 4 using surrogative models, to see whether all the influencing features (e.g.: KPIs) are part of the approved list of features. The selected top list of influencing KPIs are used as input features when training the first model.

The IMD module then trains a first model using a first machine learning process to take values of the subset of parameters as input, and output a prediction of an energy usage measurement.

The trained first model is then used to predict in step 636 the missing telemetry data (in other words, the first model is used to predict energy usage measurements for target nodes, where the target nodes are nodes for which the energy telemetry data is missing).

The predicted energy measurements are sent in step 638 to a Validation module (VID) module 610 which cross-checks the inputs and corresponding predicted energy measurements with a Bayesian Network structure as described above (e.g. with respect to the step of "validating outputs of the first model using a graph structure"), to determine whether the predicted value has a confidence level above a threshold confidence level. This is performed in step 640. The VID may have previously subscribed to the IMD for new predicted energy measurements as indicated by signal 618.

The messages in FIGS. 3 and 6 could for example be implemented as JSON/REST/HTTP or gRPC and protocol buffers, or any other suitable message type.

Predictions that pass the validation and have confidence levels above the threshold confidence level are sent in step 642 to a "Sustainable Network Engineering" (SNE) module 612 (the SNE may have previously subscribed to the VID for new validated predicted energy measurements as indicated by signal 622). The SNE uses the predicted energy measurements predict energy consumption 644, predict traffic consumption 646 and to determine 648 configuration changes suitable for network for energy savings. Energy functions (e.g.: "cell sleep", "MIMO sleep") will be chosen based on the predicted energy levels and traffic levels. The determined energy saving functions are sent to the NMS 604 in step 650 which sends them to the radio network 602 in step 652. The Radio Network 602 then performs the needed actions on the network to save energy.

There is thus provided a method of saving energy in a Communications network.

Turning now to other embodiments, there is a computer program comprising instructions which, when executed on at least one processor, cause the at least one processor to carry out any of the methods described herein, such as the method 200 described above. In some embodiments, there is a carrier containing such a computer program, wherein the carrier comprises one of an electronic signal, optical signal, radio signal or computer readable storage medium. In some embodiments there is a computer program product comprising non transitory computer readable media having stored thereon such a computer program.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

Annex 1

| KPI Name | Description |
| --- | --- |
| Number of inter frequency Neighbor relations (Num Inter Freq Adces_sum) | Inter frequency neighbor relations plays crucial role in handovers across frequencies. The AI/ML algorithm as described before found that as the number of neighbor relations increases the power consumption goes up. Hence it is an influencing KPI for power consumption. |
| Number of Cells High Overlap High RSRP Src Aggregation (%) | Level of "Reference Signal Received Power" (RSRP) at the neighboring cells for the cell under evaluation influences the power consumption. |
| PDCCH CCE High Load | Physical Downlink Control Channel (PDCCH) high load indicator influences the power consumption. |
| PDSCH Quality 2 Tx Stream | Physical Downlink Shared Channel (PDSCH) transmission quality for MIMO cells influences the power consumption. |
| DL Radio Multiplexing | Downlink Radio Multiplexing levels influence the power consumption. |
| Number of Low Dominance Samples | During an active call "number of low dominance samples" influences the power consumption. |
| Number of Cells High Overlap High RSRP Tgt Aggregation (%) | Level of neighbor cell "Reference Signal Received Power" (RSRP) at cell under evaluation by the neighboring cells influences the power consumption. |
| UL Radio Multiplexing | Uplink Radio Multiplexing levels influence the power consumption. |
| UL Radio Utilization | Uplink Radio Utilization (e.g.: Physical Resource Blocks (PRBs)) levels influence the power consumption. |
| PUCCH SINR Target Percentile | Physical uplink control channel (PUCCH) - Signal to Noise ratio levels influence the power consumption |
| Neighbour PDCCH CCE High Load | Neighbour cells Physical Downlink Control Channel (PDCCH) high load indicator influences the power consumption. |
| DL MAC Latency | Downlink Medium Access Control protocol latency influences the power consumption. |
| Number of HO Overshooting Samples | Hand over overshooting levels influence the power consumption. |
| UL HARQ Fail Rate QAM16 | Uplink - Hybrid automatic repeat request failure rate - Quadrate Amplitude Modulation 16 influences the power consumption levels. |
| DL Radio Utilization | Downlink Radio Utilization (e.g.: Physical Resource Blocks (PRBs)) levels influence the power consumption. |

Annex 1

| KPI Name | Description |
| --- | --- |
| Neighbor DL Radio Utilization | Neighbor cell downlink radio utilization influences the power consumption levels. |
| Average UE PDCP DL Throughput | Average user equipment - Packet Data Convergence Protocol (PDCP) - Downlink Throughput influences the power consumption levels. |
| DL Queue Drop Ratio | Downlink queue drop ratio levels influence the power consumption levels. |
| Cell Range Distance | Cell Range distance derived (e.g.: Using Timing Advance bins) influences the power consumption levels. |
| Number of Intra frequency neighbor relations (Num Intra Freq Adces) | Intra frequency neighbor relations plays crucial role in handovers across same frequencies. The AI/ML algorithm as described before found that as the number of neighbor relations increases the power consumption goes up. |
| Number of times interference | Neighboring cells interference during the subscribers call influences the power consumption. |
| Bad Radio Rx Interf Pwr PUCCH | Bad Radio receiver interference power in PUCCH influences the level of power consumption. |
| Average UE PDCP UL Throughput (Kbps) | Average user equipment PDCP uplink throughput influences the energy consumption levels. |
| Inter Site Distance (Km) | Distance between the cellular site influences the power consumption. |
| UL RLC ACK Fail Rate (%) | Uplink Radio Link Control acknowledgement failure rate level influences the power consumption level. |

The invention claimed is:

1. A computer implemented method performed by a node in a communications network for determining energy usage in the communications network, the method comprising:
obtaining network data for a plurality of nodes in the communications network and corresponding energy usage measurements for the plurality of nodes, wherein the network data comprises a set of values;
determining parameters that are correlated with the energy usage measurements;
based on the determined parameters, forming a subset of the set of values, wherein each value in the subset is a value for one of the parameters determined to be correlated with the energy usage measurements; and
training a first machine learning (ML) model using a training dataset that comprises the subset of values; and
using the first ML model to output information indicating a predicted amount of energy usage.

2. The method of claim 1, wherein using the first ML model to output information indicating a predicted amount of energy usage comprises:
using the first ML model to predict energy usage for a target node in the communications network, wherein using the first ML model to predict energy usage for the target node comprises:
providing a set of values for the target node to the first ML model, wherein each value in the set of values for the target node is a value for one of the parameters determined to be correlated with the energy usage measurements.

3. An apparatus operable in a communications network, the apparatus comprising:
a memory storing instructions; and
circuitry configured to communicate with the memory and to execute the instructions, wherein the instructions, when executed by the processing circuitry configures the apparatus to perform a method comprising:
obtaining network data for a plurality of nodes in the communications network and corresponding energy usage measurements for the plurality of nodes, wherein the obtained network data comprises a set of values;
determining parameters that are correlated with the energy usage measurements;
based on the determined parameters, forming a subset of the set of values, wherein each value in the subset is a value for one of the parameters determined to be correlated with the energy usage measurements; and
training a first machine learning (ML) model using a training dataset that comprises the subset of values; and
using the first ML model to output information indicating a predicted amount of energy usage.

4. The apparatus of claim 3,
wherein using the first ML model to output information indicating a predicted amount of energy usage comprises:
using the first ML model to predict energy usage for a target node in the communications network, wherein using the first ML model to predict energy usage for the target node comprises:
providing a set of values for the target node to the first ML model, wherein each value in the set of values for the target node is a value for one of the parameters determined to be correlated with the energy usage measurements.

5. The apparatus of claim 4, wherein energy telemetry measurements for the target node are unavailable to the communications network.

6. The apparatus of claim 4, wherein the target node comprises a legacy node without energy metering.

7. The apparatus of claim 3, further configured to:
determine a graph structure from the values of the subset of parameters for the nodes in the plurality of nodes, and the corresponding energy usage measurements; and
validate outputs of the first model first ML model, using the graph structure.

8. The apparatus of claim 7, wherein the graph structure comprises nodes and edges, the nodes representing the subset of parameters and the energy usage, and the edges representing causal relationships between the nodes.

9. The apparatus of claim 7, wherein the graph structure comprises a Bayesian inference network.

10. The apparatus of claim 7, wherein the node being configured to validate outputs of the first ML model comprises the node being configured to use the graph structure to determine a confidence level for the predicted energy usage.

11. The apparatus of claim 3, wherein the energy usage measurements for the plurality of nodes comprise energy usage measurements associated with different protocols performed by the plurality of nodes.

12. The apparatus of claim 11, wherein the node being configured to train the first ML model comprises the node being configured to:
train the first ML model to output a prediction of the corresponding energy usage measurement associated with a respective node performing a respective protocol.

13. The apparatus of claim 3, wherein the energy usage measurements for the plurality of nodes comprise energy usage measurements associated with different node topologies.

14. The apparatus of claim 13, wherein the node being configured to train the first ML model comprises the node being configured to:
train the first ML model to output a prediction of the corresponding energy usage measurement associated with a respective node topology.

15. The apparatus of claim 3, wherein the energy usage measurements for the plurality of nodes comprise energy usage measurements associated with different product models of the plurality of nodes.

16. The apparatus of claim 15, wherein the node being configured to train the first ML model comprises the node being configured to:
train the first ML model to output a prediction of the corresponding energy usage measurement associated with a respective product model.

17. The apparatus of claim 4, wherein the node is further configured to:
use the predicted energy usage for the target node in a resource orchestration procedure to allocate resources to the target node.

18. The apparatus of claim 3, wherein the node being configured to train a first ML model comprises the node being configured to:
train a plurality of models using a plurality of machine learning processes; and
select the first ML model, from the plurality of models, based on a measure of accuracy as determined in a validation procedure.

19. The apparatus of claim 3, wherein the parameters comprise configuration parameters and/or network performance indicators.

20. A non-transitory computer readable medium storing a computer program comprising instructions which, when executed on at least one processor of a node, cause the node to perform the method of claim 1.

* * * * *